United States Patent
Rocas

(10) Patent No.: US 8,836,980 B2
(45) Date of Patent: Sep. 16, 2014

(54) USING VIRTUAL PRINTERS TO SELECT PRINTING MENU CHOICES FROM LIMITED RESOURCE DEVICES

(75) Inventor: Marc V. Rocas, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 204 days.

(21) Appl. No.: 13/468,656

(22) Filed: May 10, 2012

(65) Prior Publication Data

US 2013/0301077 A1 Nov. 14, 2013

(51) Int. Cl.
G06F 3/12 (2006.01)
G06K 15/00 (2006.01)

(52) U.S. Cl.
USPC .......................................... 358/1.15; 358/1.1

(58) Field of Classification Search
USPC ........ 358/1.1, 1.9, 1.14, 1.15, 1.18, 400, 402; 709/201, 203, 220, 225, 242; 345/902, 345/156, 656, 522, 520
See application file for complete search history.

(56) References Cited

U.S. PATENT DOCUMENTS

| | | | |
|---|---|---|---|
| 6,032,004 A | 2/2000 | Mirabella, Jr. et al. | |
| 6,542,252 B2 | 4/2003 | Brossman et al. | |
| 6,552,813 B2 | 4/2003 | Yacoub | |
| 6,798,530 B1 | 9/2004 | Buckley et al. | |
| 6,930,795 B1 | 8/2005 | Motamed et al. | |
| 7,312,886 B2 | 12/2007 | Gomi | |
| 7,463,382 B2 | 12/2008 | Saeki | |
| 7,636,040 B2 * | 12/2009 | Yoshida | 340/525 |
| 7,984,120 B2 | 7/2011 | Yoshida | |
| 2008/0294976 A1 | 11/2008 | Rosenberg | |

* cited by examiner

Primary Examiner — Gabriel Garcia
(74) Attorney, Agent, or Firm — Gibb & Riley, LLC

(57) ABSTRACT

A method and system include at least one printer, and a computerized print server operatively connected to the printer. The printer is capable of performing a plurality of different operations, and the different operations are enabled and disabled by selection of different menu choices. Further, the computerized print server stores a plurality of virtual printers, and each of the virtual printers comprises a print queue identifying one printer and storing a pattern of the menu choices. Each of the pattern of the menu choices is different in each of the virtual printers. The process of choosing a selected virtual printer from the virtual printers for a print job automatically chooses a selected printer and a selected pattern of menu choices.

16 Claims, 4 Drawing Sheets

USING VIRTUAL PRINTERS TO SELECT PRINTING MENU CHOICES FROM LIMITED RESOURCE DEVICES

BACKGROUND

Embodiments herein generally relate to selection of print menu items using print servers and communications with limited resource devices, such as mobile devices.

Printer option menus on limited resource devices (e.g., mobile devices, personal digital assistants (PDAs), cell phones, tablet devices, etc.) are very limited. Additionally, mobile printing is limited to very basic menus and such menus do not show the multitude of features that modern multifunction printing devices (MFDs) can provide.

This is unlikely to change because the processing resources of such devices are limited (limited screen size, memory, processing speed, communication speed, etc.) and because of the desire to keep the end-user printing experience as simple as can be. Further, the manufacturers of such limited resource devices maintain proprietary rights to the display capabilities of such devices, which prevents printer manufacturers from displaying all printer menu options on such limited resource devices.

As a result, the myriad of enterprise print options that are available through modern multifunction printing devices (through the graphic user interfaces of the multifunction devices themselves or through graphic user interfaces of full function computers that are in communication with such multifunction devices) and are essentially unavailable to end-users of limited resource devices and administrators alike.

SUMMARY

An exemplary system herein includes a networked printer. The printer is capable of performing a plurality of different operations, which are enabled and disabled by selection of different menu choices.

The networked printer stores a plurality of virtual printers. Each of the virtual printers is a print queue identifying at least one of the possible printer configurations and storing a pattern of the menu choices corresponding to the configuration. The virtual printers are different from one another, and each is distinct and uses a different printer configuration and/or different menu choices. Therefore, the virtual printers that identify the same printer will each have a different pattern of menu choices for that same printer. In other words, for the same printer, each of the patterns of menu choices is different in each of the virtual printers. Further, when identifying a printer, the methods and systems herein can assign a virtual Internet Protocol (IP) address to each printer.

Further, the network connection is accessible by limited function computerized devices. The act of choosing a virtual printer from the choices of virtual printers for a print job by the limited function computerized devices automatically chooses a printer (or class of printer) and a pattern of menu choices. The limited function computerized devices may be incapable of displaying all of the menu choices for a given printer. Therefore, the computerized print server only displays an identification of each of the virtual printers to the limited function computerized devices and does not display all the menu choices to the limited function computerized devices. The simple one-step process of choosing a virtual printer automatically chooses the selected printer and the selected pattern of the menu choices, and this single act of choosing the selected virtual printer is all that is required to make all menu selections, and no other additional action is necessary.

An exemplary method embodiment herein stores a plurality of virtual printers on a networked printer. Again, the printer is capable of performing a plurality of different operations, the different operations are enabled and disabled by selection of different menu choices, each of the virtual printers comprises a print queue identifying one of the many possible printers configurations and storing a pattern of the menu choices, and each of the pattern of the menu choices is different in each of the virtual printers. This exemplary method also chooses a selected virtual printer for a print job, and the choosing process automatically chooses a selected printer and a selected pattern of menu choices, without requiring further selection inputs.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, the myriad of enterprise print options that are available through modern multifunction printing devices are essentially unavailable to end-users of limited resource devices. Therefore, the embodiments herein provide MFD virtualization with the ability to create a virtual printer service for a multifunction device that can be pre-configured to pre-select a collection of options. Additionally, the virtual printer can be named and provisioned to be network visible by automatic assignment of a virtual IP address. As an example, one of the virtual printers could have the pre-selected options of duplex printing, secure job deletion, and stapling; while a different virtual printer could have the pre-selected options of one-sided, black and white printing. Each virtual printer has a unique name that corresponds to the options the virtual printer enables, and the virtual printers are network visible so that they can be used by limited resource devices, without installing and running any specialized software programs on the limited resource devices.

With systems and methods herein, the virtual printer can be conveyed to customers as a printer queue. The virtual printers provided herein allow a single user selection action to automatically pre-select any number of configurations without effecting to changes to the printer as a whole (unless a certain virtual printer is designated as a default printer queue). The configuration achieved via these virtual printers is independent of a print job stream. These virtual printers (printer queues) can be created and jobs may be submitted to them via any existing print driver located on the limited resource devices, or by using Internet Printing Protocol (IPP).

Figure 1:
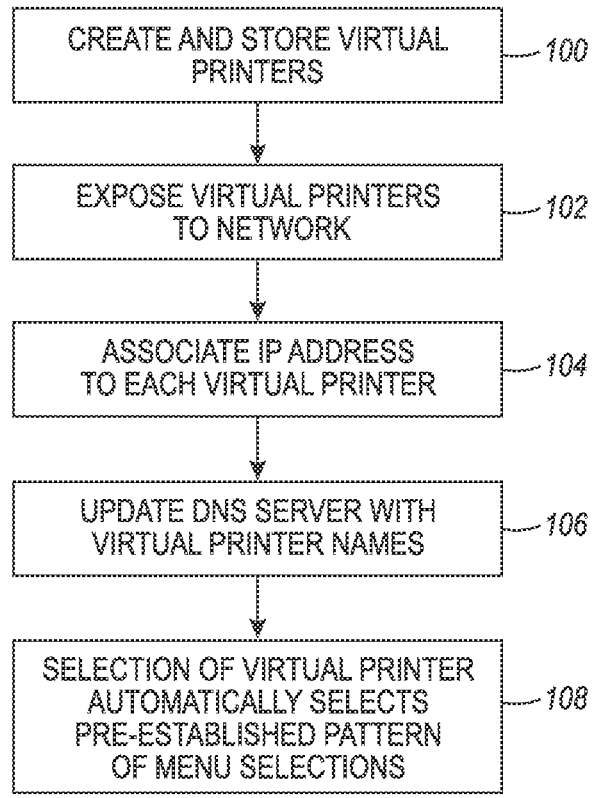
FIG. 1 is a flow diagram illustrating embodiments herein.

Therefore, as shown in flowchart form in FIG. 1, exemplary methods herein create and store a plurality of virtual printers on a computerized print server in item 100. The systems and methods expose virtual printers to the network, by creating a virtual IP address for the print server in item 102. In item 104 these systems and methods associate that IP address with a virtual printer queue name on the server. Further, in item 106, the systems and methods herein automatically update the domain name system (DNS) server with the virtual printer queue name pointing to the IP address, such that the virtual printer is published on the network and can be selected from any device (such as mobile devices) without requiring special print protocols or application.

As shown in item 108, some exemplary methods herein allow a user to choose one of the virtual printers for a print job. The process in item 108 automatically chooses a selected printer and a selected pattern of menu choices, without requiring further selection inputs.

Thus, the virtual printers allow for sophisticated pre-selected settings of a printing device that are made available to mobile devices without the need for the mobile print application to support device print parameter programming. Further, such systems and methods provide the ability for users to select pre-program complex printing options to print from mobile devices, without the need for the mobile device to support the sophisticated capabilities of the multifunction devices. The systems and methods herein make the network visible indistinguishable from a physical printer, thus achieving the virtualization of an office multifunction device. This allows pre-configured multifunction device network appliances to support simple mobile print protocols, allows customers and administrators to fully take advantage of their multifunction devices with current mobile print standards, and enables pre-canned workflows for mobile devices that can be administered by information technology (IT) departments and provisioned for use by mobile devices.

As noted above, the manufacturers of such limited resource devices maintain proprietary rights to the display capabilities of such devices, which prevents printer manufacturers from displaying all printer menu options on such limited resource devices. For example, some manufacturers of limited resource devices desire to maintain an extremely simplified user interface, which can limit the amount of information (and the amount of printing choices) provided through the limited resource device. Similarly, some limited resource devices simply do not have the necessary memory, screen size, input devices, etc., and are therefore physically incapable of displaying all the menu items that a modern day multifunction printing device provides.

Because processes 104 and 106 published all the virtual printers on the network, any existing print driver within the limited use device that can recognize a network printer can also recognize the virtual printers and send print jobs to the virtual printers. Therefore, with the embodiments herein, there is no need to install or run any specialized software programs on the limited resource devices. Instead, the selection of all printer menu options is performed when the virtual printers are created in item 100. The creation of the virtual printers is performed by the system administrator working with the print server and is a completely separate process from any actions taken with the limited resource devices.

Because this activity does not require any additions to or changes to the software programs already existing on the limited resource devices, the proprietary rights of the manufacturers of the limited resource devices are not affected or infringed upon. Thus, any existing software program operating within the proprietary rights of a manufacturer of a limited resource device that provides the ability to print to items that are present on the network will be able to recognize the virtual printers provided by the methods and systems herein and, in this way, the methods and systems herein allow the user of a limited resource device to utilize all functional capabilities of the multifunction printing devices.

To the contrary, if a specialized software program were required to be written for the limited resource devices, such a specialized software program would have to comply with all of the proprietary rights of the manufacturer of the limited resource device, which would be expensive and most likely not be able to display all the capabilities of highly sophisticated multifunction printing devices. In other words, the methods and systems herein allow the user to take full advantage of all capabilities of modern multifunction printing devices, without having to write specialized software programs that comply with the priority requirements of each manufacturer of each and every different type of limited resource device.

Figure 2:
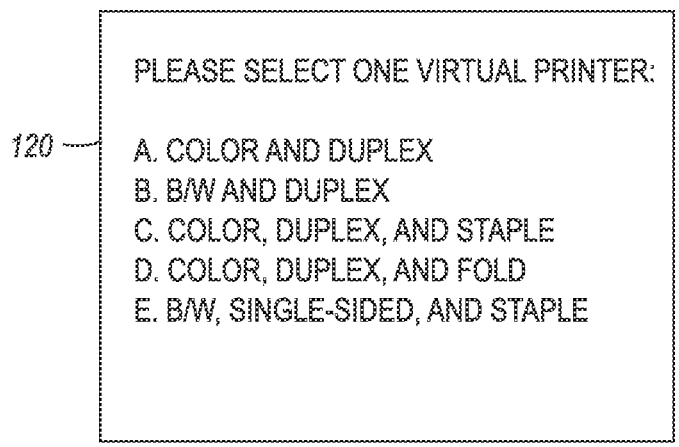
FIG. 2 is a schematic diagram of a screenshot according to embodiments herein.

FIG. 2 illustrates an exemplary screen shot 120 that illustrates multiple virtual printers (print queues) that could be selected (A-E) by a user of a limited resource device. Note that the printer menu options (black and white printing, color printing, single-sided, duplex, stapling, folding, etc.) that each of the virtual printers (A-E) has pre-selected are included in the title of each virtual printer. Thus, for example, by selecting virtual printer C (that is named "Color, Duplex, and the Staple") the user's print job will be printed in color, be duplexed, and be stapled. Thus, this single action (selection of virtual printer C) provides multiple pre-selected printer menu choices to be enabled, without the user having to individually select any printer menu choices.

Figure 3:
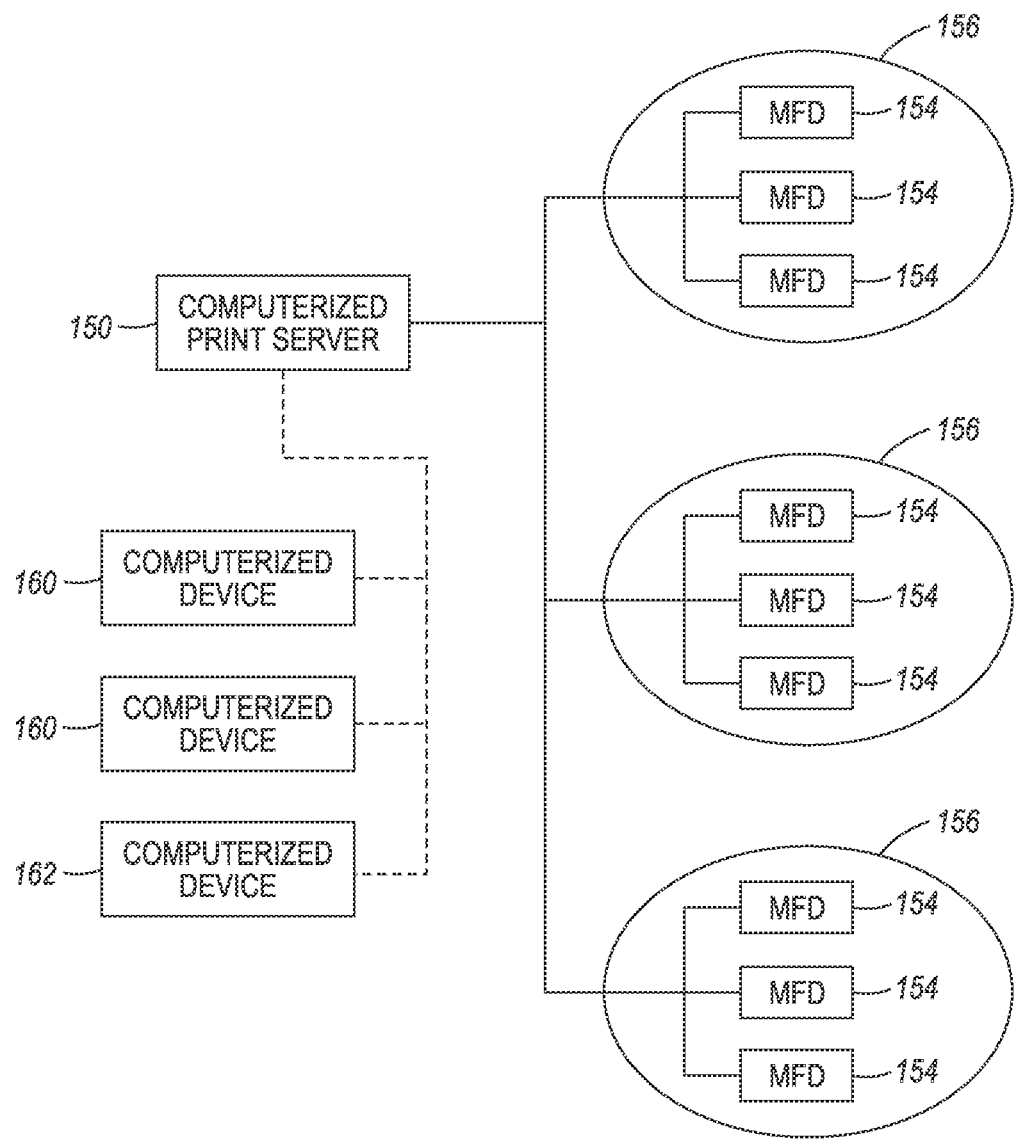
FIG. 3 is a schematic diagram of a system according to embodiments herein.

FIG. 3 illustrates a computerized print server 150 that is operatively connected to various multifunction devices 154, which can be grouped into groups 156 (by location, function, pricing, features, etc.). The connection between the computerized print server 150 and the various multifunction devices 154 can be a direct wired connection, a wireless connection, a network connection, etc., 152. Further, various computerized devices 160, 162 are similarly operatively connected to (again, through a direct wired connection, a wireless connection, a network connection, etc.) the computerized print server 150. Some of such computerized devices 160 may be limited resource devices, and may be unable to effectively display all the menu options that the various multifunction devices 154 can provide. Therefore, instead of displaying full printer menu options on the computerized devices 160, only virtual printers (as illustrated in FIG. 2, for example) could be displayed. One ordinarily skilled in the art would understand that the virtual printers provided on the network could be equally used by limited resource devices 160 and by full function computerized devices 162.

Thus, as shown, an exemplary system herein includes, a computerized print server 150 operatively (directly or indirectly) connected to at least one printer 154, and a network connection 152 operatively connected to the computerized print server 150. The printer 154 is capable of performing a plurality of different operations, which are enabled and disabled by selection of different menu choices.

The computerized print server 150 stores a plurality of virtual printers (A-E). Each of the virtual printers (A-E) is a print queue (or any other form of storage item or file) identifying at least one of the printers (A-E) and storing a pattern of the menu choices. The virtual printers (A-E) are different from one another, and each is distinct and uses a different printer 154 and/or different menu choices. Therefore, the virtual printers (A-E) that identify the same printer will each have a different pattern of menu choices for that same printer. In other words, for the same printer or class of printer, each of the patterns of printer menu choices is different in each of the virtual printers (A-E). Further, when identifying a printer 154, the methods and systems herein can assign a virtual Internet Protocol (IP) address to each printer 154.

As shown in FIG. 3, the network connection 152 is accessible by limited function computerized devices 160 (e.g., mobile devices, personal digital assistants (PDAs), cell phones, tablet devices, etc.). These limited function computerized devices 160 are distinguished from the user interface displays on printers or full-function computers 162 because such limited function computerized devices 160 have limited screen size, memory, processing speed, communication speed, etc. Therefore, the limited function computerized devices 160 may be incapable of displaying (or efficiently or effectively displaying) all of the menu choices for a given printer 154.

The single button (single click) act of choosing a virtual printer (A-E) for a print job by the user operating the limited function computerized devices 160 automatically chooses a printer 154 and a pattern of menu choices (e.g., virtual printer C selects printing menu choices of printing in color, duplexing, and be stapling). Therefore, the computerized print server 150 only displays an identification of each of the virtual printers (A-E) to the limited function computerized devices 160 and does not display all the printing menu choices to the limited function computerized devices 160. The simple one-step process of choosing a virtual printer (A-E) automatically chooses the selected printer (A-E) and the selected pattern of the menu choices, and this single act of choosing the selected virtual printer (A-E) is all that is required to make all printer menu selections, and no other additional action is necessary.

Figure 4:
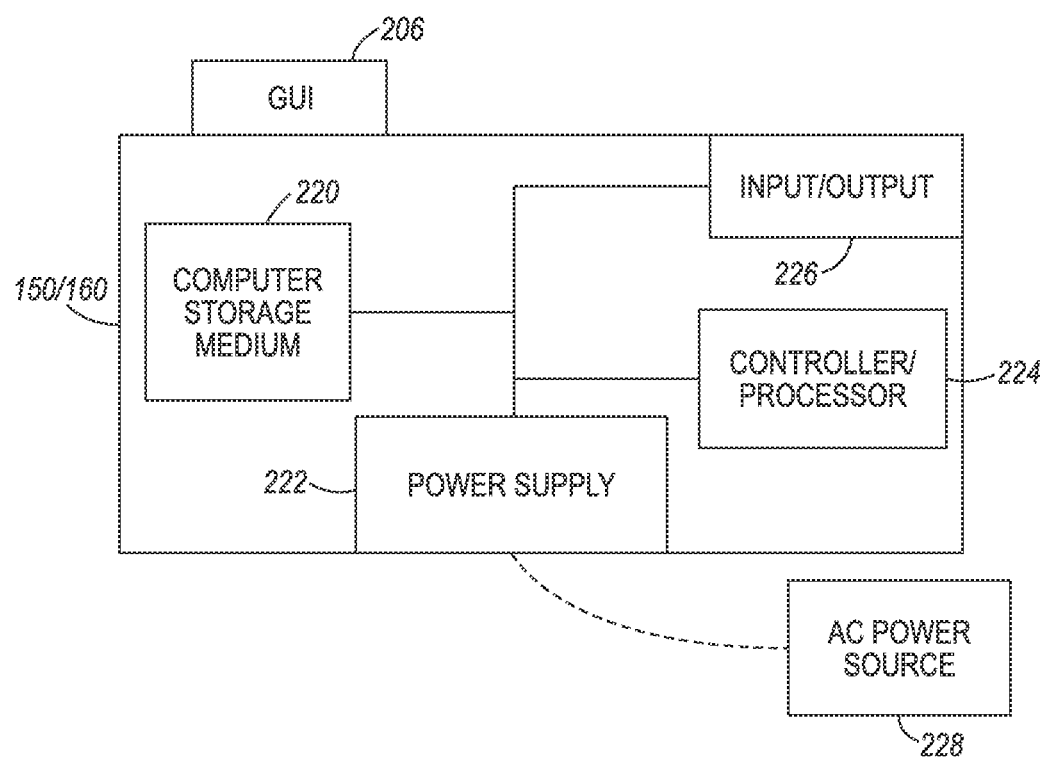
FIG. 4 is a schematic diagram of a device according to embodiments herein.
Figure 5:
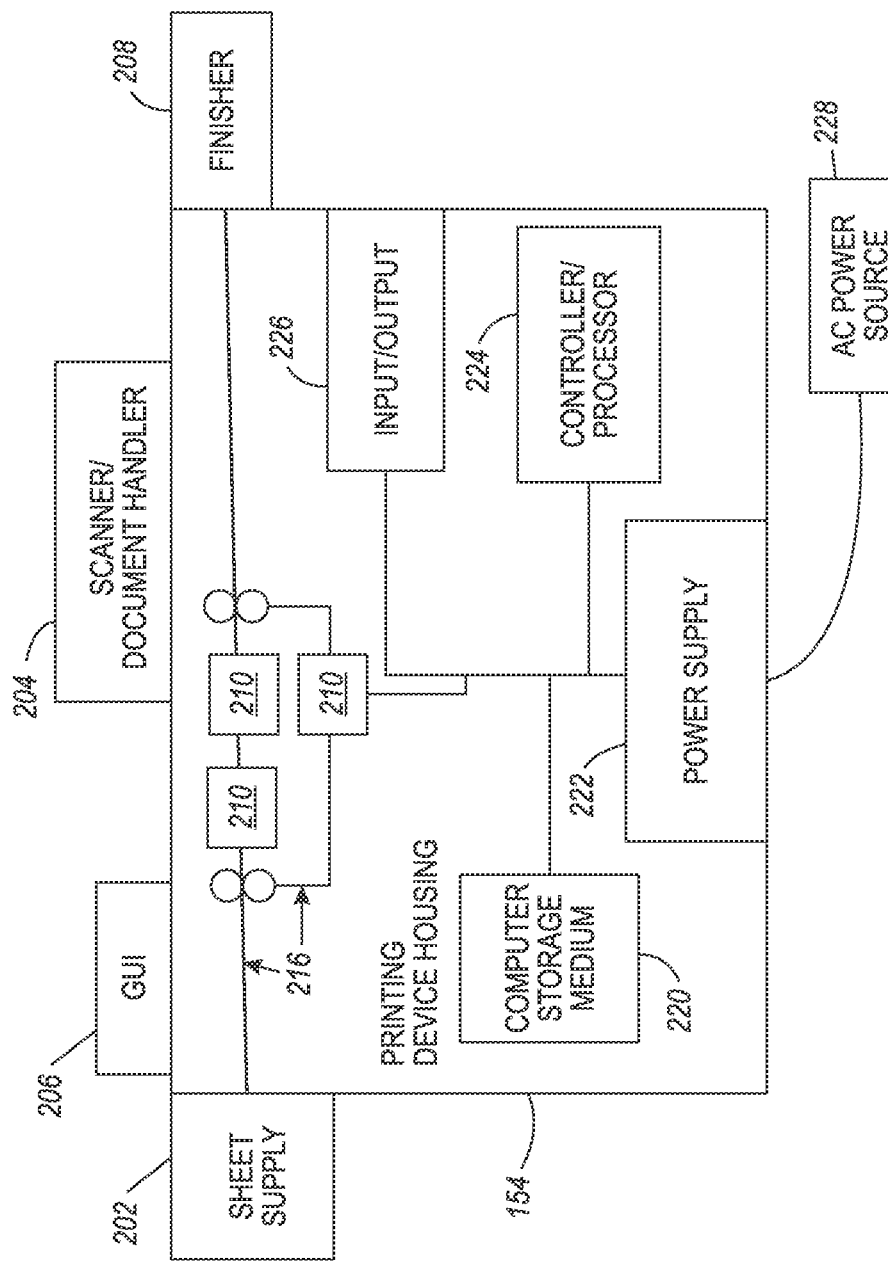
FIG. 5 is a schematic diagram of a device according to embodiments herein.

FIGS. 4 and 5 illustrate a simplified schematic of such print servers 150 and computerized devices 160 (FIG. 4) as well as an exemplary multifunction device 154 (FIG. 5—which can comprise, for example, a printer, copier, multifunction machine, etc.). Such devices are computerized devices and include a controller/processor 224, a communications port (input/output) 226 operatively connected to the processor 224 and to a computerized network external to the devices, and a graphic user interface assembly 206. Thus, such devices have one or more functional components that operate on power supplied from the alternating current (AC) 228 by the power supply 222. The power supply 222 connects to an external alternating current power source 228 and converts the external power into the type of power needed by the various components.

The input/output device 226 is used for communications to and from the devices, and the processor 224 controls the various actions of the devices. A non-transitory computer storage medium device 220 (which can be optical, magnetic, capacitor based, etc.) is readable by the processor 224 and stores instructions that the processor 224 executes to allow the devices to perform their various functions, such as those described herein.

The multifunction device 154 can further include at least one marking device (printing engines) 210 operatively connected to the processor 224, a media path 216 positioned to supply sheets of media from a sheet supply 202 to the marking device(s) 210. After receiving various markings from the printing engine(s), the sheets of media can optionally pass to a finisher 208 which can fold, staple, sort, etc., the various printed sheets. Also, the printing device 154 can include at least one accessory functional component (such as a scanner/document handler 204, sheet supply 202, finisher 208, etc.).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multifunction machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A system comprising:
at least one printer; and
a computerized print server operatively connected to said printer,
said printer being capable of performing a plurality of different operations,
said different operations being enabled and disabled by selection of different menu choices,
said computerized print server storing a plurality of virtual printers,
each of said virtual printers comprising a print queue identifying one of said at least one printer and storing a pattern of said menu choices, each of said pattern of said menu choices being different in each of said virtual printers, and choosing a selected virtual printer from said virtual printers for a print job using a limited function computerized device incapable of displaying all of said menu choices automatically chooses a selected printer from said at least one printer and a selected pattern of menu choices from said pattern of said menu choices, said selected pattern of menu choices being less than all of said menu choices and being based on screen size, memory, processing speed, and communication speed of said limited function computerized device.

2. The system according to claim 1, said computerized print server displaying only an identification of each of said virtual printers to limited function computerized devices operatively connected to said print server and not displaying said menu choices to said limited function computerized devices.

3. The system according to claim 1, when a plurality of same-printer virtual printers identify a same printer of said at least one printer, each of said same-printer virtual printers comprises a different pattern of said pattern of said menu choices for said same printer.

4. The system according to claim 1, said identifying said one of said at least one printer comprising assigning a virtual Internet Protocol (IP) address to said at least one printer.

5. A system comprising:
at least one printer;
a computerized print server operatively connected to said printer; and
a network connection operatively connected to said computerized print server,
said printer being capable of performing a plurality of different operations,
said different operations being enabled and disabled by selection of different menu choices,
said computerized print server storing a plurality of virtual printers,
each of said virtual printers comprising a print queue identifying one of said at least one printer and storing a pattern of said menu choices,
each of said pattern of said menu choices being different in each of said virtual printers,
said network connection being accessible by limited function computerized devices incapable of displaying all of said menu choices,
choosing a selected virtual printer from said virtual printers for a print job by one of said limited function computerized devices automatically chooses a selected printer from said at least one printer and a selected pattern of menu choices from said pattern of said menu choices,
said selected pattern of menu choices being less than all of said menu choices and being based on screen size, memory, processing speed, and communication speed of said limited function computerized devices, and
said automatically choosing of said selected printer and said selected pattern of said menu choices being performed with a single act of choosing said selected virtual printer and without additional action.

6. The system according to claim 5, said computerized print server displaying only an identification of each of said virtual printers to said limited function computerized devices and not displaying said menu choices to said limited function computerized devices.

7. The system according to claim 5, when a plurality of same-printer virtual printers identify a same printer of said at least one printer, each of said same-printer virtual printers comprises a different pattern of said pattern of said menu choices for said same printer.

8. The system according to claim 5, said identifying said one of said at least one printer comprising assigning a virtual Internet Protocol (IP) address to said at least one printer.

9. Method comprising:
storing a plurality of virtual printers on a computerized print server operatively connected to at least one printer, said printer being capable of performing a plurality of different operations, said different operations being enabled and disabled by selection of different menu choices, each of said virtual printers comprising a print queue identifying one of said at least one printer and storing a pattern of said menu choices, each of said pattern of said menu choices being different in each of said virtual printers; and
choosing a selected virtual printer from said virtual printers for a print job using a limited function computerized device incapable of displaying all of said menu choices,
said choosing automatically chooses a selected printer from said at least one printer and a selected pattern of menu choices from said pattern of said menu choices, and
said selected pattern of menu choices being less than all of said menu choices and being based on screen size, memory, processing speed, and communication speed of said limited function computerized device.

10. The method according to claim 9, further comprising said computerized print server displaying only an identification of each of said virtual printers to limited function computerized devices operatively connected to said print server and not displaying said menu choices to said limited function computerized devices.

11. The method according to claim 9, when a plurality of same-printer virtual printers identify a same printer of said at least one printer, each of said same-printer virtual printers comprises a different pattern of said pattern of said menu choices for said same printer.

12. The method according to claim 9, said identifying said one of said at least one printer comprising assigning a virtual Internet Protocol (IP) address to said at least one printer.

13. A non-transitory computer-readable storage medium storing a plurality of instructions executable by a computerized device to perform a method comprising:
storing a plurality of virtual printers on a computerized print server operatively connected to at least one printer, said printer being capable of performing a plurality of different operations, said different operations being enabled and disabled by selection of different menu choices, each of said virtual printers comprising a print queue identifying one of said at least one printer and storing a pattern of said menu choices, each of said pattern of said menu choices being different in each of said virtual printers; and
choosing a selected virtual printer from said virtual printers for a print job using a limited function computerized device incapable of displaying all of said menu choices,
said choosing automatically chooses a selected printer from said at least one printer and a selected pattern of menu choices from said pattern of said menu choices, and
said selected pattern of menu choices being less than all of said menu choices and being based on screen size, memory, processing speed, and communication speed of said limited function computerized device.

14. The non-transitory computer-readable storage medium according to claim 13, said method further comprising said computerized print server displaying only an identification of each of said virtual printers to limited function computerized devices operatively connected to said print server and not displaying said menu choices to said limited function computerized devices.

15. The non-transitory computer-readable storage medium according to claim 13, when a plurality of same-printer virtual printers identify a same printer of said at least one printer, each of said same-printer virtual printers comprises a different pattern of said pattern of said menu choices for said same printer.

16. The non-transitory computer-readable storage medium according to claim 13, said identifying said one of said at least one printer comprising assigning a virtual Internet Protocol (IP) address to said at least one printer.

* * * * *